UNITED STATES PATENT OFFICE.

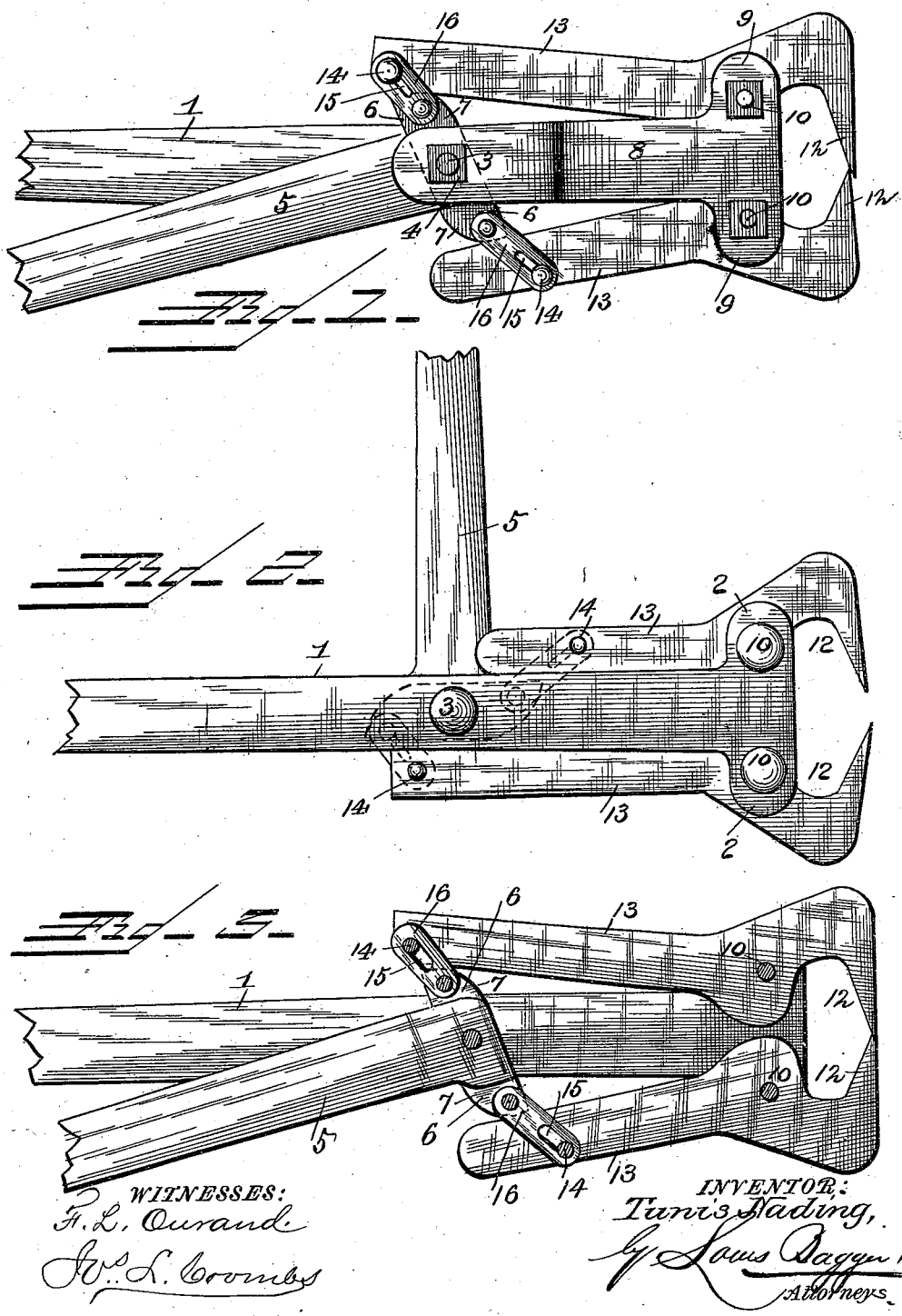

TUNIS NADING, OF ST. LOUIS CROSSING, INDIANA.

BOLT-CUTTER.

SPECIFICATION forming part of Letters Patent No. 556,275, dated March 10, 1896.

Application filed July 26, 1895. Serial No. 557,193. (No model.)

*To all whom it may concern:*

Be it known that I, TUNIS NADING, a citizen of the United States, and a resident of St. Louis Crossing, in the county of Bartholomew and State of Indiana, have invented certain new and useful Improvements in Bolt-Cutters; and I do hereby declare that the following is a full, clear, and exact description of the invention, which will enable others skilled in the art to which it appertains to make and use the same, reference being had to the accompanying drawings, which form a part of this specification.

My invention relates to devices for cutting off the ends of bolts when too long, so that they shall be of the required length.

The object of the invention is to provide an improved construction of the same by which the bolts may be readily cut or trimmed, and which shall possess superior advantages with respect to efficiency in operation.

The invention consists in the novel construction and combination of parts hereinafter fully described and claimed.

In the accompanying drawings, Figure 1 is a side elevation of a bolt-cutter constructed in accordance with my invention, the cutting-jaws being closed. Fig. 2 is a similar view looking from the opposite side. Fig. 3 is a longitudinal section of the same, the jaws being closed.

In the said drawings the reference-numeral 1 designates a handle consisting of a flat metal bar formed at one end with lugs 2, and intermediate its ends is provided with a pivot-bolt 3, having a screw-nut 4. Pivoted to this bolt is a short handle 5, provided with two oppositely-extending lateral lugs 6, which are curved on opposite sides, as at 7, Fig. 1. The pivot-bolt also passes through an aperture in the inner end of a metal plate 8, the outer end of which is provided with apertured lugs 9 registering with the lugs at the end of the handle 1. Passing through these lugs are bolts 10, by which the handle 1 and plate are connected together, and which also serve as pivots for the jaws 12. The meeting ends of these jaws are beveled, forming cutting-edges, which overlap each other. Secured to the shanks 13 of these jaws, near the inner ends thereof, are headed pins 14, which engage with slots 15 in the outer ends of links 16, which are pivoted to the lugs of the handle 5.

In using the device the handle 5 is forced outward, and through the medium of the lugs thereon and the links and shank of the jaws the latter are opened or spread apart, so as to engage with the bolt to be cut. The said handle is then forced inward, when the cutting-edges of the jaw will grasp and cut the bolt.

From the above, taken in connection with the drawings, it will be seen that great pressure can be applied to the jaws in clamping the bolt without injuring the device, as in closing the jaws the curved portions of the lugs 6 engage with the inner end of the shanks of the jaws, so that there will be no strain upon the links, which latter are only used to open the jaws. The slots in the links allow the lugs to engage with the shanks of the jaws to close the latter.

The beveled ends of the jaws overlapping each other prevent the cutting-edges from coming in contact with each other, and thus avoid liability of their being dulled.

Having thus fully described my invention, what I claim is—

In a bolt-cutter, the combination with the handle having apertured lugs at its outer end, the plate having corresponding lugs, the connecting-bolts passing through said lugs, and the intermediate bolt connecting the inner end of the plate with the handle, of the jaws pivotally connected with said plate and handle having beveled overlapping cutting-edges, the shanks provided with headed pins, the slotted links connected therewith and the handle pivoted to said intermediate bolt, formed with curved lugs with which said links are pivotally connected; substantially as described.

In testimony that I claim the foregoing as my own I have hereunto affixed my signature in presence of two witnesses.

TUNIS NADING.

Witnesses:
JOHN OLINGER,
DAVID S. RILEY.